(12) United States Patent
Locatelli et al.

(10) Patent No.: US 10,511,159 B2
(45) Date of Patent: Dec. 17, 2019

(54) COMPUTER-IMPLEMENTED METHOD FOR CONFIGURING AN ELECTRONIC RELAY

(71) Applicant: ABB S.p.A., Milan (IT)

(72) Inventors: Emilio Battista Locatelli, San Pellegrino Terme (IT); Simone Micheli, Zogno (IT)

(73) Assignee: ABB S.p.A., Milan (IT)

( * ) Notice: Subject to any disclaimer, the term of this patent is extended or adjusted under 35 U.S.C. 154(b) by 35 days.

(21) Appl. No.: 15/945,371

(22) Filed: Apr. 4, 2018

(65) Prior Publication Data

US 2018/0287367 A1   Oct. 4, 2018

(30) Foreign Application Priority Data

Apr. 4, 2017   (EP) .................................... 17164719

(51) Int. Cl.
| | | |
|---|---|---|
| H02H 3/00 | (2006.01) | |
| G06F 3/0484 | (2013.01) | |
| H02H 1/00 | (2006.01) | |

(52) U.S. Cl.
CPC ......... *H02H 3/006* (2013.01); *G06F 3/04847* (2013.01); *H02H 1/0092* (2013.01)

(58) Field of Classification Search
None
See application file for complete search history.

(56) References Cited

U.S. PATENT DOCUMENTS

| | | | |
|---|---|---|---|
| 6,798,191 B1* | 9/2004 | Macfarlane | G01R 22/065 324/156 |
| 7,197,550 B2* | 3/2007 | Cheline | H04L 29/06 370/252 |

(Continued)

OTHER PUBLICATIONS

European Patent Office, Extended Search Report issued in corresponding Application No. 17164719.1, dated Oct. 20, 2017, 8 pp.

(Continued)

*Primary Examiner* — Ramesh B Patel
(74) *Attorney, Agent, or Firm* — J. Bruce Schelkopf; Taft Stettinius & Hollister LLP

(57) ABSTRACT

A method for configuring an electronic relay for an electric power distribution grid. The method includes the following steps: providing a graphic user interface on a computer display, the graphic user interface including graphic resources activatable by a user; providing first graphic resources on the graphic user interface to assist a user in selecting a set of protection functionalities to be provided by the electronic relay; providing second graphic resources on the graphic user interface to assist a user in providing configuration values to configure operating parameters processed by the electronic relay to provide the selected set of protection functionalities, the operating parameters comprising first protection parameters related to voltage protection functionalities and second protection parameters related to frequency protection functionalities; checking whether the electronic relay meets minimum operating requirements to operate; and if the electronic relay meets minimum operating requirements, transmitting configuration information including the configuration values to the electronic relay.

20 Claims, 11 Drawing Sheets

(56) References Cited

U.S. PATENT DOCUMENTS

Figure 1:
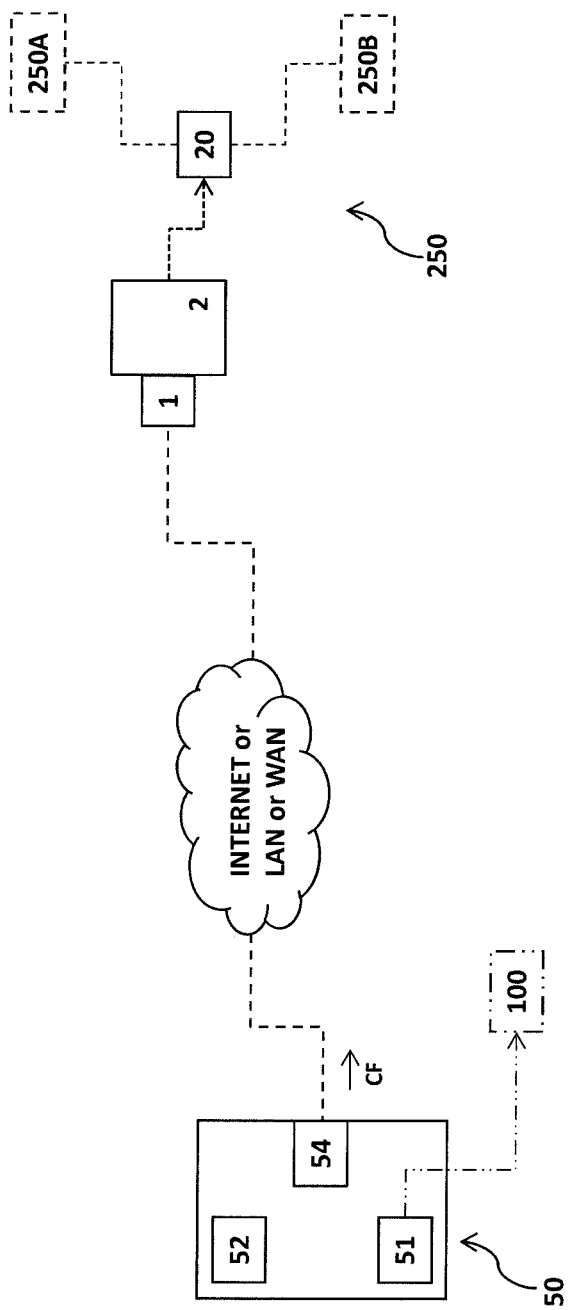

| | | | | |
|---|---|---|---|---|
| 7,673,030 | B2* | 3/2010 | Hite | H04L 12/2803 370/254 |
| 7,710,587 | B2* | 5/2010 | Crosier | H04L 41/0806 358/1.13 |
| 8,621,117 | B2* | 12/2013 | Stoupis | H02J 13/001 710/10 |
| 9,063,739 | B2* | 6/2015 | Ward | G06F 8/34 |
| 9,191,228 | B2* | 11/2015 | Fulker | H04L 12/2803 |
| 2006/0116794 | A1* | 6/2006 | Stoupis | H02J 13/001 700/286 |
| 2007/0055889 | A1* | 3/2007 | Henneberry | G01R 19/2513 713/186 |
| 2012/0166582 | A1* | 6/2012 | Binder | H04L 63/18 709/217 |
| 2014/0277801 | A1* | 9/2014 | Cioraca | G05F 1/70 700/292 |
| 2015/0229516 | A1* | 8/2015 | Thanos | H04L 41/0809 370/254 |
| 2018/0159615 | A1* | 6/2018 | Kim | H04B 7/2606 |
| 2018/0173176 | A1* | 6/2018 | Locatelli | G06F 3/04842 |
| 2018/0287384 | A1* | 10/2018 | Locatelli | G06Q 50/06 |

OTHER PUBLICATIONS

ABB: "Protection and Control IED Manager," PCM600 Product Guide, Jan. 10, 2013, XP055408442, Retrieved from the Internet http://www04.abb.com/global/seitp/seitp202.nsf/0/d13cebbc495afa9bc1257b1e0028edfa/$file/PCM600_pg_756448_ENh.pdf.

ABB: "Voltage protection and control REU615 Compact and versatile solution for utility and industrial power distribution systems," May 25, 2016, XP055408437, Retrieved from the Internet: http://library.e.abb.com/public/69472bf79956471cb2a5e2135efdbd32/REU615_broch_757062_LRENh.pdf?x-sign=eyNpEU0800MIC+ul4Wc0tH1gl98x+Qb5ilxy+tq/1/GmW70gmqlC4FM10z0DYatS.

ABBProtectionControl: "Efficiencies in system integration and testing—Substation automation tools," YouTube, Apr. 14, 2016, p. 1, XP054977745, Retrieved from the Internet: https://www/youtube.com/watch?v=twqsH25LVRY.

* cited by examiner

COMPUTER-IMPLEMENTED METHOD FOR CONFIGURING AN ELECTRONIC RELAY

The present invention relates to the field of electric power distribution grids.

More particularly, the present invention relates to a computer-implemented method to configure an electronic relay of an electric power distribution grid operating at low or medium voltage levels. For the purposes of the present application, the term "low voltage" (LV) relates to operating voltages lower than 1 kV AC and 1.5 kV DC whereas the "medium voltage" relates to operating voltages up to some tens of kV, e.g. up to 72 kV AC and 100 kV DC.

Electric power distribution grids comprise switching devices (e.g. circuit breakers, disconnectors, contactors, and the like) designed to enable specific sections of an electric power distribution grid to operate properly.

In many cases, a switching device is operatively associated with an electronic protection and control device (hereinafter referred to as "electronic relay") adapted to control said switching device.

Typically, a very important task of an electronic relay is to control the associated switching device in such a way to provide protection functionalities for some portions of an electric power distribution grid.

To this aim, an electronic relay is normally configured to check the operating conditions of the electric power distribution grid and generate commands to prompt the intervention of the associated switching device, when this is required to protect the electric power distribution grid, e.g. in the event of failures or overloads.

As is known, an electronic relay needs to process a set of operating parameters (hereinafter referred to as "protection parameters") to carry out the above-mentioned protection functionalities.

Such operating parameters need to be properly set-up (or "configured" according to a widely used terminology) during the operating life of the relay, e.g. when this latter is installed on the field or during maintenance interventions.

Traditional solutions for configuring the operating parameters of an electronic relay normally require a time-consuming cabling activity to acquire the inputs and outputs of the relay and an intensive programming activity to model and set-up the functionalities thereof.

All these activities normally entail the intervention of specialized personnel with a remarkable increase of the overall costs.

The main aim of the present invention is to provide a method for setting-up the operating parameters of an electronic relay of an electric power distribution grid, which allows solving or mitigating the technical problems evidenced above.

Within this aim, an object of the present invention is to provide a method to carry out a quick and efficient configuration of an electronic relay.

A further object of the present invention is to provide a method that can be easily carried out even by non-specialized operators.

A further object of the present invention is to provide a method that can be easily computer-implemented without the adoption of expensive processing resources.

These aim and objects are achieved by a method to set-up the operating parameters of an electronic relay in an electric power distribution grid, according to the following claim 1 and the related dependent claims.

In a general definition, the method, according to the invention, comprises the following steps:

providing a graphic user interface on a computer display, said graphic user interface including graphic resources activatable by a user;

providing first graphic resources on said graphic user interface to assist a user in selecting a set of protection functionalities to be provided by said electronic relay;

providing second graphic resources on said graphic user interface to assist a user in providing configuration values (CF) to configure operating parameters processed by said electronic relay to provide the selected set of protection functionalities, said operating parameters comprising first protection parameters related to voltage protection functionalities and second protection parameters related to frequency protection functionalities;

checking whether said electronic relay meets minimum operating requirements to operate;

if said electronic relay meets said minimum operating requirements, transmitting configuration information including said configuration values (CF) to said electronic relay.

Preferably, said operating parameters further comprise third protection parameters related to additional voltage protection functionalities.

Preferably, said operating parameters further comprise fourth protection parameters to manage inputs and outputs of said electronic relay.

According to an aspect of the invention, said first graphic resources comprise one or more first graphic objects automatically uploaded by said computerised device on said graphic user interface. Each first graphic object is activatable to select a corresponding set of protection functionalities.

According to an aspect of the invention, said second graphic resources comprise second graphic objects automatically uploaded by said computerised device on said graphic user interface upon activation of said first graphic resources. Said second graphic objects are activatable to enable the activation of further graphic objects included in said second graphic resources.

According to an aspect of the invention, said second graphic resources comprise third and fourth graphic objects to set-up said first protection parameters. When enabled by said second graphic objects, said third graphic objects are activatable to command said computerised device to upload said fourth graphic objects on said graphic user interface. Said fourth graphic objects are configured to assist a user in providing configuration values to set-up said first protection parameters. According to an aspect of the invention, said second graphic resources comprise fifth and sixth graphic objects to set-up said second protection parameters. When enabled by said second graphic objects, said fifth graphic objects are activatable to command said computerised device to upload said sixth graphic objects on said graphic user interface. Said sixth graphic objects are configured to assist a user in providing configuration values to set-up said second protection parameters.

According to an aspect of the invention, said second graphic resources comprise seventh and eighth graphic objects to set-up said secondary voltage protection parameters. When enabled by said second graphic objects, said seventh graphic objects are activatable to command said computerised device to upload said eighth graphic objects on said graphic user interface. Said eighth graphic objects are configured to assist a user in providing configuration values to set-up said third protection parameters.

According to an aspect of the invention, said second graphic resources comprise ninth and tenth graphic objects to set-up said fourth protection parameters. When enabled by said second graphic objects, said ninth graphic objects are activatable to command said computerised device to upload said tenth graphic objects on said graphic user interface. Said tenth graphic objects are configured to assist a user in providing configuration values to set-up said fourth protection parameters. According to an aspect of the invention, said step of transmitting said configuration information to said electronic relay comprises the following steps:

receiving coded information to enable transmission of said configuration information to said electronic relay;

checking said coded information;

transmitting said configuration information to said electronic relay if said coded information is correct.

Preferably, said configuration information is transmitted to said electronic relay via an Internet or LAN or WAN communication line.

The method, according to the invention, is particularly suitable for being implemented by a computerised device capable of communicating with said electronic relay via an Internet or LAN or WAN communication line.

In some further aspects, the present invention thus relates to a computer program, according to the following claim 12, and to a computerised device, according to the following claim 13.

Figure 2:
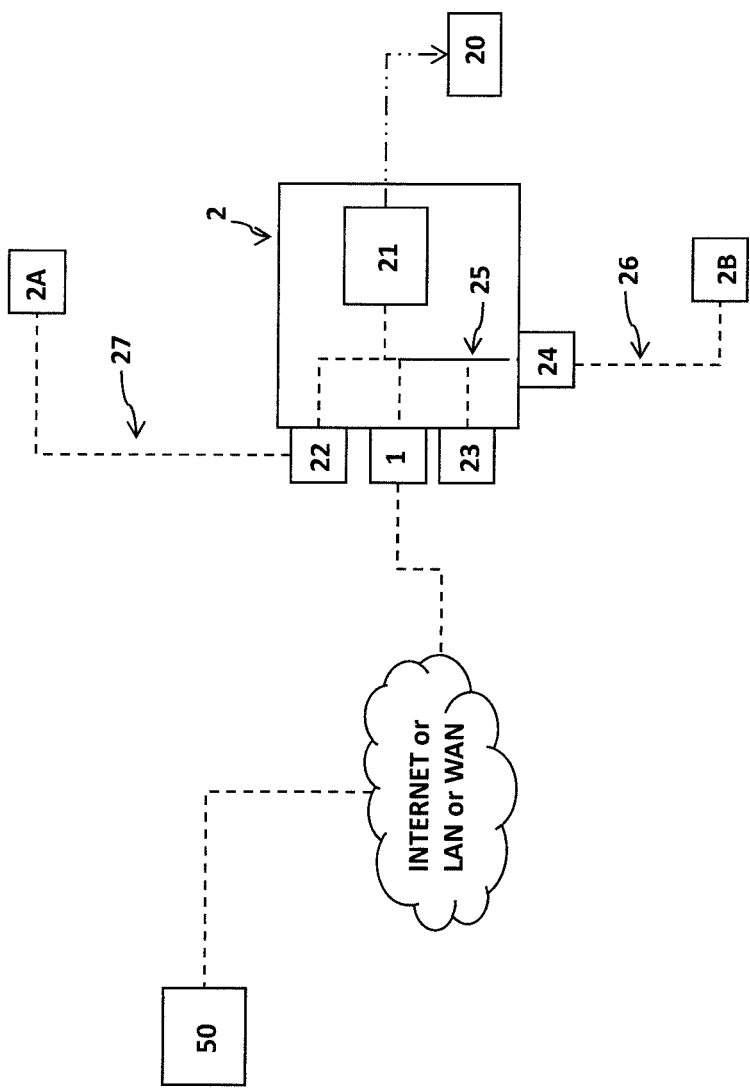
Figure 3:
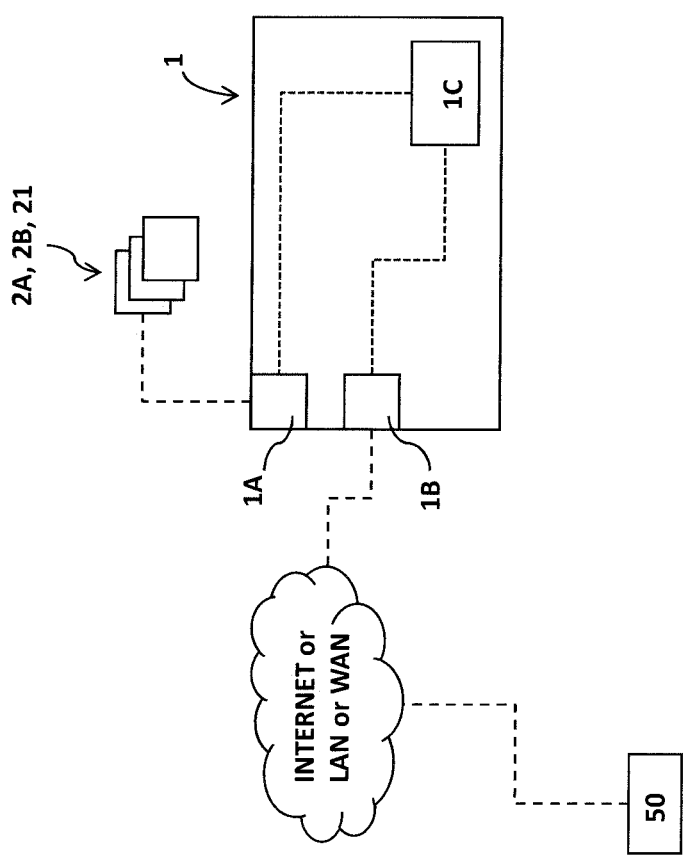
Figure 4:
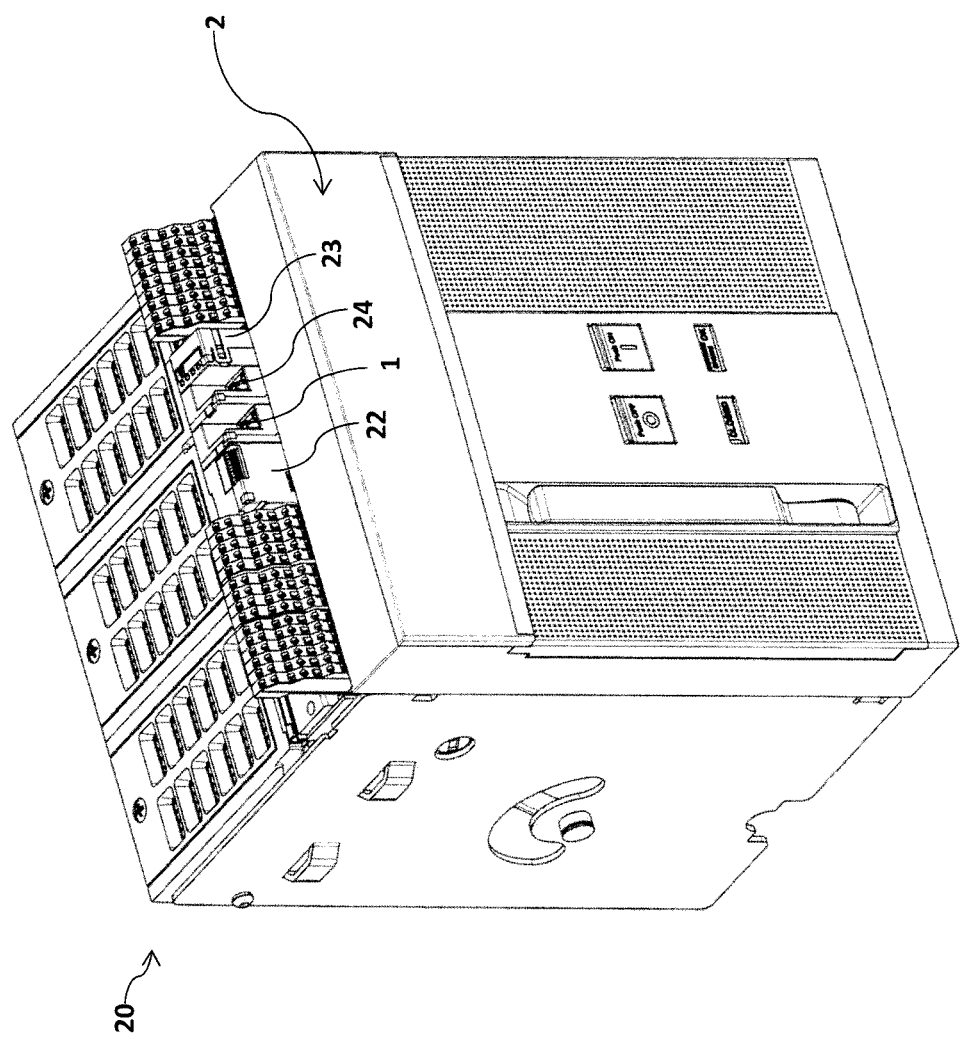

Further characteristics and advantages of the present invention will emerge more clearly from the description of preferred, but not exclusive embodiments, of which non-limiting examples are shown in the attached drawings, in which:

FIGS. 1-3 are schematic views showing a switching device in an electric power distribution grid, an electronic relay operatively associated to said switching device and a computerised device implementing the method for configuring said electronic relay, according to the invention;

FIG. 4 schematically shows the switching device of FIGS. 1-3 in an embodiment;

FIGS. 5-11 are schematic views showing the steps of the method, according to the invention.

With reference to the above-mentioned figures, the present invention refers to a method 100 for configuring an electronic relay 2 in an electric power distribution grid 250, preferably operating at low and medium voltage levels.

Conveniently, the electronic relay 2 is operatively associated with a corresponding switching device 20 (e.g. a circuit breaker, disconnector, contactor, or the like) of the electric power distribution grid 250 to control the operation of said switching device.

Conveniently, the electronic relay 2 is adapted to provide protection functionalities on one or more portions 250A, 250B of the electric power distribution grid 250, which may be electrically connected with or disconnected from one to another by the switching device 20 controlled by said relay.

To this aim, the electronic relay 2 is adapted to check the operating conditions of the electric power distribution grid 250 and generate commands to prompt the intervention of the associated switching device 20, when this is required to protect the electric power distribution grid, e.g. in the event of faults or overloads.

In general, the electronic relay 2 comprises one or more inputs, at which it can receive input signals (e.g. data signals or control signals) from one or more devices (e.g. sensors or other relays) operatively connected thereto, and one or more outputs, at which it can provide output signals (e.g. data signals or control signals) for one or more devices (e.g. the switching device 20) operatively connected thereto.

Referring to FIG. 2, the electronic relay 2 preferably comprises a control unit 21 configured to manage the operation of said electronic relay. The control unit 21 is conveniently provided with processing resources (e.g. including one or more microprocessors) capable of executing software instructions stored or storable in a storage medium (e.g. a memory of said control unit).

The electronic relay 2 may comprise or be operatively coupled with various types of communication buses 25, 26, 27.

As an example, the electronic relay 2 may comprise a local bus 25 conveniently designed to provide a communication channel between the control unit 21 and other accessory devices 1, 22, 23, 24 of the electronic protection relay 2. The local bus 25 may implement a communication protocol of the FIELDBUS type, such as ETHERNET, with communication modalities of the "multi-master" type. As a further example, the electronic relay 2 may be arranged to communicate with further several electronic protection devices 2A through a system bus 27 of the electric power distribution grid 250. The system bus 27 may be conveniently designed to provide a communication channel between the control unit 21 and further electronic devices 2A (e.g. further electronic relays) that may be also in a remote location with respect to the relay 2. The system bus 27 may implement a communication protocol of the MODBUS, PROFIBUS, PROFINET or MODBUS-TCP type, using communication modalities of the "master-slave" type.

As a further example, the electronic relay 2 may be arranged to communicate with further electronic devices 2B through a switchboard bus 26 of the switchgear including the relay itself. The switchboard bus 26 is conveniently designed to provide a dedicated communication channel between the protection and control unit 21 and further electronic devices 2B (e.g. further electronic relays) of said switchgear. The switchboard bus 26 may implement a communication protocol of the FIELDBUS type using communication modalities of the "multi-master" type.

The electronic relay 2 may comprise or be operatively coupled with various accessory devices designed to potentiate/expand the functionalities of the control unit 21, provide an interface towards external communication buses (as the accessory devices 22, 24) or remote devices (as the accessory device 1), provide an auxiliary interface (as the accessory device 23) for the protection and control unit 21 (such as a display or a LED interface), and the like.

Preferably, the accessory devices 1, 22, 23, 24 are adapted to be removably mounted together with the corresponding electronic protection relay 2 on the switching device 20, as shown in FIG. 4. However, according to other solutions, the accessory devices 1, 22, 23, 24 may be removably mounted on the external case of the electronic protection relay 2, when this latter is a self-standing unit, or may form internal electronic modules integrated within the corresponding electronic relay 2.

Conveniently, the electronic relay 2 has remote communication capabilities for communication with one or more remote computerized devices through an Internet or LAN or WAN communication line.

To this aim, preferably, the electronic relay 2 is operatively coupled with or comprises an accessory device 1.

Referring to FIG. 3, the accessory device 1 preferably comprises at least a first communication port 1A suitable for communication with electronic devices (e.g. the control unit 21) included in or operatively connected with the corresponding electronic relay 2.

As an example, the communication port 1A may be an ETHERNET port suitable to be operatively coupled with the local bus 25 of the corresponding electronic relay 2.

Preferably, the accessory device 1 comprises at least a second communication port 1B suitable for communication with one or more remote computerized devices 50 through an Internet or LAN or WAN communication line.

As an example, the communication port 1B may be a TCP or UDP port suitable for an Internet protocol suite.

Information may be transmitted through an Internet or LAN or WAN communication line by means of a suitable communication cable (e.g. of the ETHERNET type) or a suitable antenna arrangement (e.g. of the Wi-Fi or Bluetooth type).

Preferably, the accessory device 1 comprises a corresponding processing unit 1C configured to manage the operation of said accessory device. The processing unit 1C is conveniently provided with processing resources (e.g. including one or more microprocessors) capable of executing software instructions stored or storable in a storage medium (e.g. a memory of said control unit). It is important to notice that the accessory device 1 is capable of providing the corresponding electronic relay 2 with a direct connection to an Internet or LAN or WAN communication line without the need of using or arranging dedicated communication buses (such as e.g. the system bus 27).

In other words, the accessory device 1 is adapted to operate as an Internet or LAN or WAN gateway through which the electronic relay 2 (in particular the protection and control unit 21 thereof) can directly communicate with a remote computerised device (e.g. the computerised device 50).

As mentioned above, the method 100, according to the invention, is a method for configuring the electronic relay 2.

In the framework of the present invention, "configuring" the electronic relay 2 consists, in general, in setting-up some operating parameters used by said electronic relay to implement its functionalities, in particular the above-mentioned protection functionalities.

In general, said operating parameters may be set-up by providing the electronic relay 2 with suitable numeric or logic values (configuration values) that can be stored and processed by the electronic relay itself.

As it will apparently emerge from the following, the method 100, according to the invention, is particularly suitable for being implemented by a computerised device 50 and, for the sake of clarity, it will be described in the following with specific reference to this kind of implementation.

In general, the computerised device 50 may be of any known type, such a desktop computer, a laptop computer, a tablet, a smartphone or the like.

Referring to FIG. 1, the computerised device 50 is provided with processing resources 51 (e.g. including one or more microprocessors) configures to manage the operation of said computerised device. Said processing resources are capable of executing software instructions stored or storable in a storage medium (e.g. a memory of said computerised device) to implement the configuration method 100, according to the invention.

The computerised device 50 comprises or it is operatively associated to a display 52 that is driven by the processing resources 51.

Conveniently, the computerised device 50 has Internet or LAN or WAN communication capabilities.

To this aim, it is preferably equipped with one or more communication ports 54 (e.g. ETHERNET or Bluetooth or Wi-Fi ports) for communication with remote electronic devices through the Internet or a LAN or a WAN. As an example, the communication ports 54 may be TCP or UDP ports suitable for an Internet protocol suite.

Information may be transmitted through a suitable communication cable (e.g. of the ETHERNET type) or a suitable antenna arrangement (e.g. of the Wi-Fi or Bluetooth type).

The computerised device 50 is thus conveniently capable of communicating with the electronic relay 2 via an Internet or LAN or WAN communication line.

The method 100, according to the invention, for configuring the electronic relay 2 is now described in details.

Figure 5:
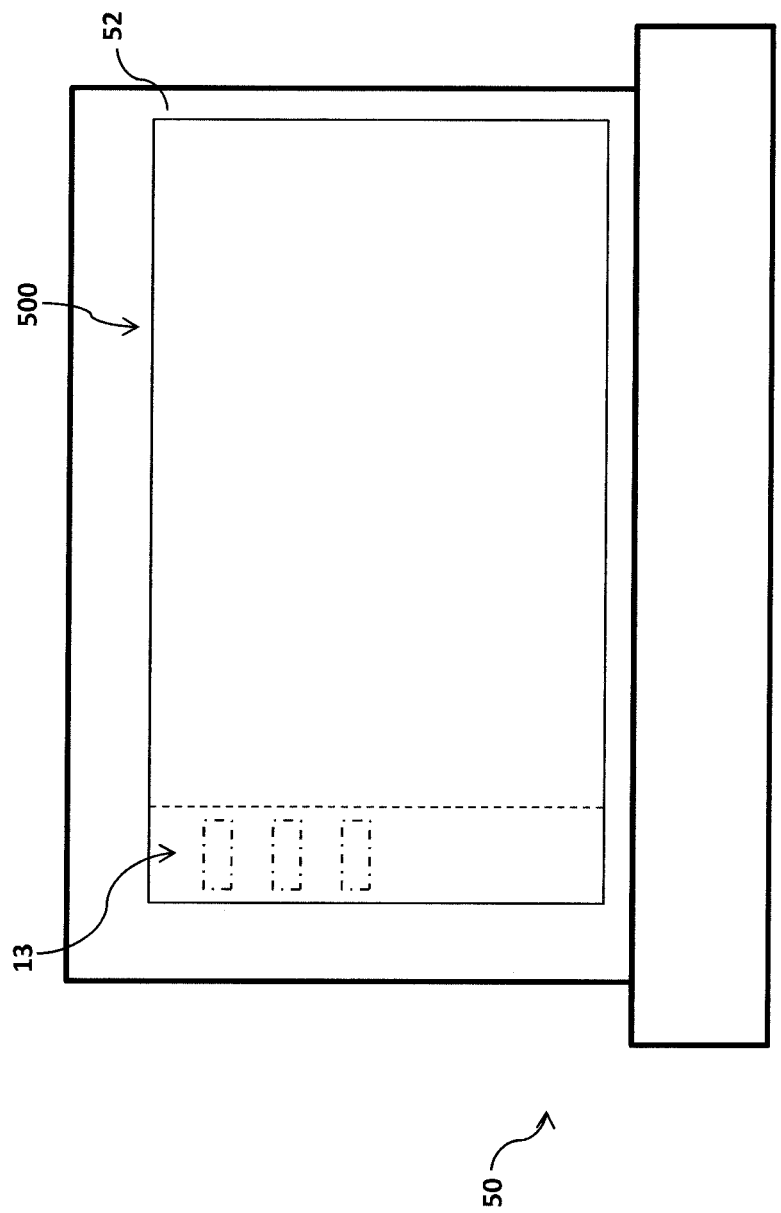

According to the invention, the method 100 comprises a step in which the computerised device 50 provides a graphic user interface 500 on the computer display 52 (FIG. 5).

The graphic user interface (GUI) 500 is a visual graphic environment comprising visual graphic resources 11, 12, 13 (e.g. graphic icons, graphic windows, graphic cursors, visual indicators, visual menus, and the like) to assist a user in configuring the electronic relay 2 by means of the computerised device 50.

In general, the graphic resources 11, 12, 13 are made available to allow a user to provide in input to the computerised device 50 specific commands or configuration information to configure the electronic relay 2.

Conveniently, the graphic resources 11, 12, 13 are activatable by a user in accordance to known activation modes adopted in computerised devices, e.g. clicking on said graphic resources through a mouse pointer (e.g. when the display 52 is a computer monitor or a lap-top display) or touching corresponding interactive regions of the display 52 (e.g. when the display 52 is a touch-screen display).

Configuration information can be provided in input to the computerised device 50 by a user in accordance to known input modes adopted in computerised devices, e.g. typing or activating dedicated graphic objects (graphic cursors, graphic icons, and the like).

Preferably, the GUI 500 comprises one or more configuration pages, at which the graphic resources 11, 12, 13 are made available. Each configuration page may include one or more configuration sections where the above-mentioned graphic resources are displayed.

Preferably, the GUI 500 comprises auxiliary graphic resources 13 (e.g. graphic buttons) on each configuration page to allow a user to navigate through different configuration pages or to save or to upload said configuration pages on or from a storage memory of the computerised device 50.

According to the invention, the method 100 comprises a step of providing first graphic resources 11 on the GUI 500 to assist a user in selecting a set of protection functionalities to be executed by the electronic relay 2.

Figure 6:
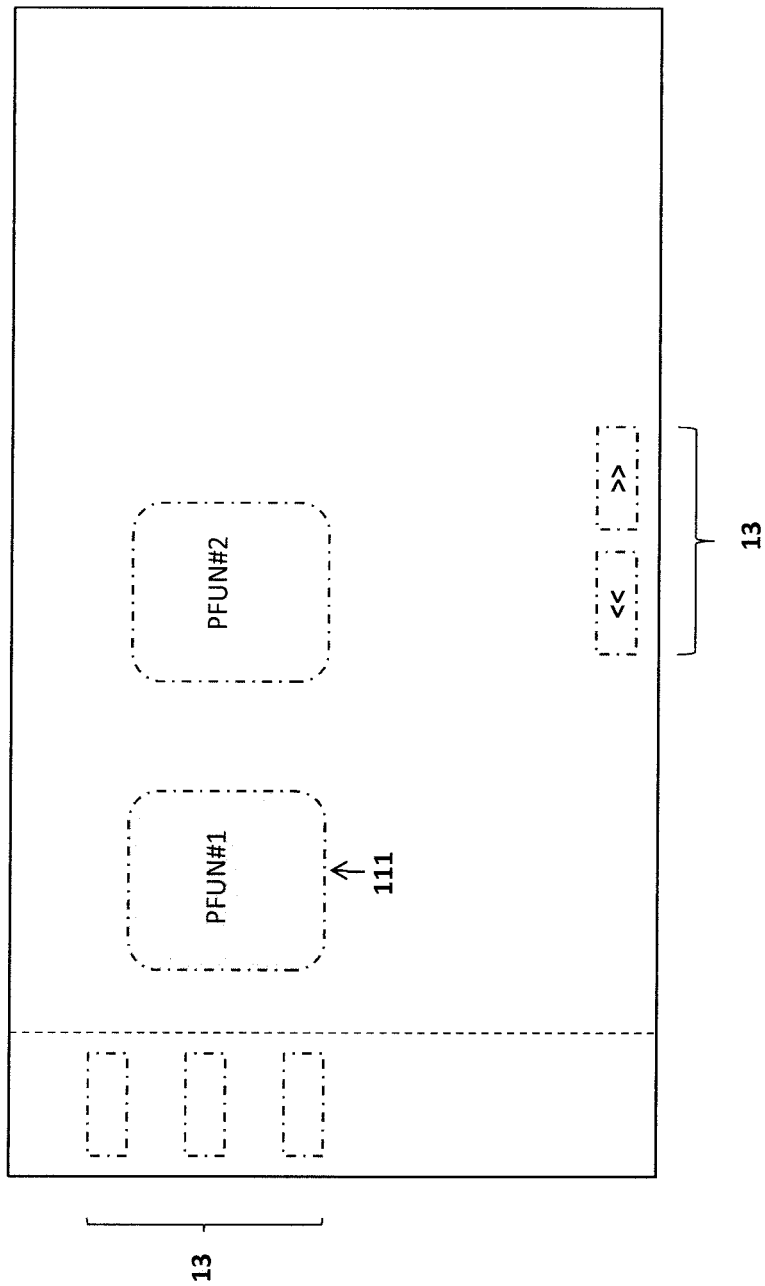

Preferably, the first graphic resources 11 comprises one or more first graphic objects 111 (e.g. graphic icons) that are automatically uploaded by the computerised device 50 on the GUI 500 to guide a user in selecting a set of protection functionalities available for the electronic relay 2 (FIG. 6).

By activating of the graphic objects 111, the computerised device 50 receives in input configuration information to be transmitted to the electronic relay 2. Such configuration information will allow the relay 2 to retrieve a stored set of software instructions corresponding to the selected set of protection functionalities to be executed. By executing said software instructions, the electronic relay 2 will carry out the selected set of protection functionalities.

In the schematic example of FIG. 6, a given set of protection functionalities is selected by clicking on the corresponding graphic icon PFUN#1. Such protection functionalities will be implemented by the electronic relay 2 in operation.

The sets of protection functionalities available for selection may be of various type depending on the structure of the electric power distribution grid 250 and, more particularly, depending on the operative role played by the switching device 20 in the electric power distribution grid 250.

As an example, referring again to FIG. 6, a set of protection functionalities corresponding to the graphic icon PFUN#1 may be selected if the switching device 20 is adapted to operate as a main circuit breaker controlling the electrical connection or disconnection of a micro-grid 250B with a utility electric power distribution line 250A.

As a further example, a different set of protection functionalities corresponding to the graphic icon PFUN#2 may be selected if the switching device 20 is adapted to operate as a local circuit breaker controlling the electrical connection or disconnection of an electric generation plant 250B (e.g. a solar plant) with a utility electric power distribution line 250A.

Preferably, the sets of protection functionalities available for selection are those foreseen by standards regulations, e.g. by the well-known standard CEI-016, in relation to the operative role played by the switching device 20 in the electric power distribution grid 250.

In response to the activation of a graphic object 111, the computerised device 50 uploads on the GUI 500 second graphic resources 12 to configure operating parameters related to the protection functionalities to be implemented by the electronic relay 2 and selected by means of the first graphic resources 11 (FIGS. 7-10). The electronic relay 2 will process said operating parameters to carry out the selected protection functionalities.

Conveniently, the operating parameters to be configured by means of the graphic resources 12 comprise first protection parameters related to voltage protection functionalities and second protection parameters related to frequency protection functionalities.

As an example, the above-mentioned first protection parameters may be related to voltage protection functionalities foreseen by standard regulations for an electronic relay, e.g. the ANSI59 and ANSI27 protection functionalities foreseen by the well-known standard regulation CEI-016. As an example, the above-mentioned second protection parameters may be related to frequency protection functionalities foreseen by standards regulations for an electronic relay, e.g. the ANSI81H and ANSI81L protection functionalities foreseen by the well-known standard regulation CEI-016.

Preferably, the operating parameters to be configured by means of the graphic resources 12 further comprise third protection parameters related to further voltage protection functionalities.

As an example, the above-mentioned third protection parameters may be related to further voltage protection functionalities foreseen by standards regulations for an electronic relay, e.g. the ANSI27vd, ANSI59V0 and ANSI59Vi protection functionalities foreseen by the well-known standard regulation CEI-016.

Preferably, the operating parameters to be configured by means of the graphic resources 12 further comprise fourth protection parameters to manage the inputs and outputs of the electronic relay 2 during the execution of the selected set of protection functionalities.

As an example, the above-mentioned fourth protection parameters may define the inputs of the electronic protection relay 2 for communication with suitable sensors of the electric power distribution grid 250 and the outputs of the electronic protection relay 2 for communication with the switching device 20.

Preferably, the second graphic resources 12 comprise second graphic objects 121 that are automatically uploaded on the GUI 500 in response to the activation of the first graphic resources 11, more particularly upon the activation of a selected graphic object 111.

The second graphic objects 121 are activatable to enable the activation of further graphic objects 122, 124, 126, 128 included in the second graphic resources 12.

Figure 7:
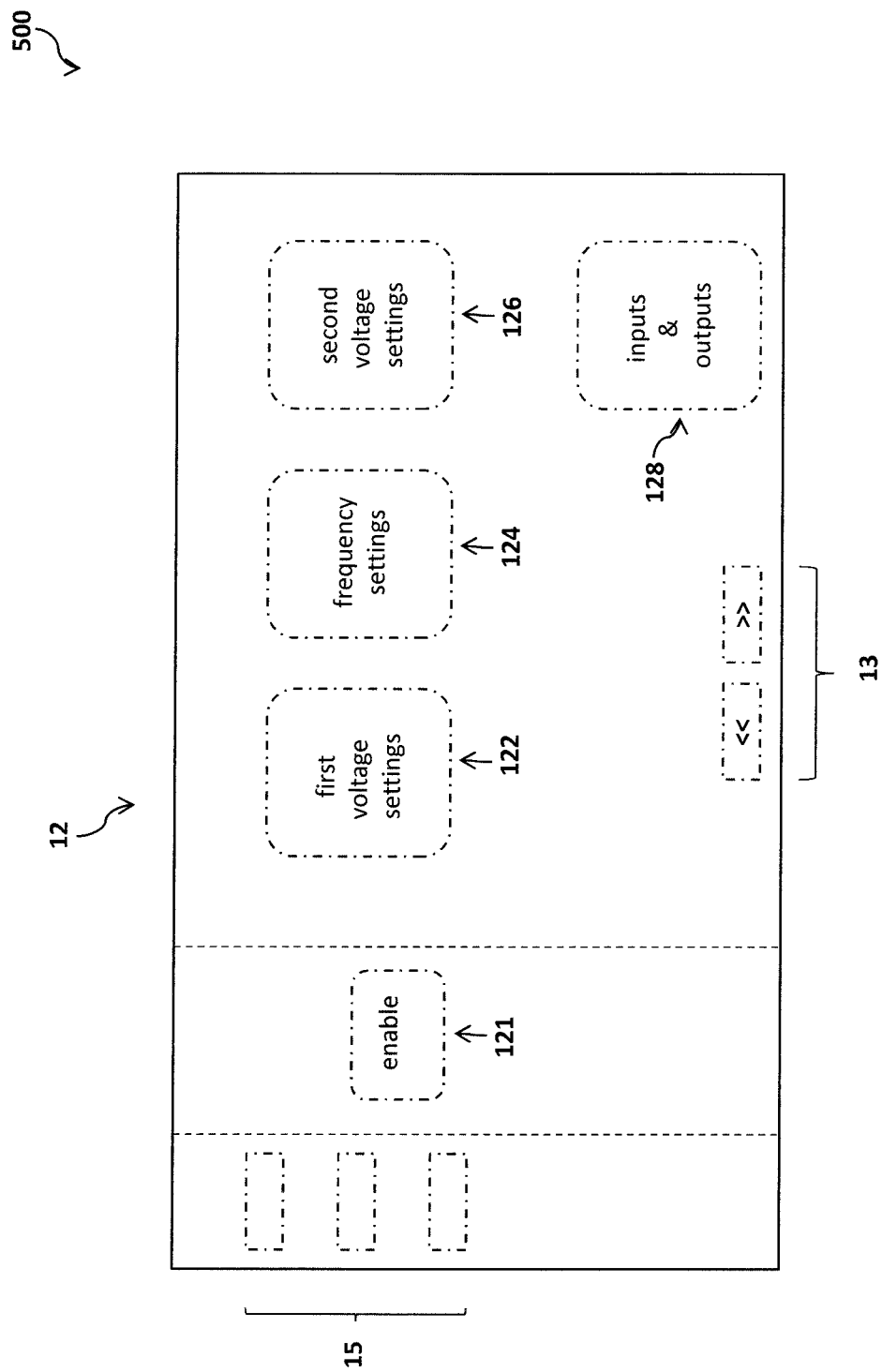

In the example of FIG. 7, the second graphic objects 121 comprise a graphic icon "enable" that can be clicked on to enable the activation of the graphic objects 122, 124, 126, 128 uploaded on the GUI 500.

Preferably, the second graphic resources 12 comprise third and fourth graphic objects 122, 123 to set-up the above-mentioned first protection parameters.

The third graphic objects 122 are automatically uploaded on the GUI 500 by the computerised device 50 in response to the activation of the first graphic resources 11, more particularly upon the activation of a selected graphic object 111.

Upon the enabling by the second graphic objects 121, the third graphic objects 122 can be suitably activated to upload the fourth graphic objects 123 on the GUI 500.

The fourth graphic objects 123 are automatically uploaded on the GUI 500 by the computerised device 50 in response to the activation of the third graphic objects 122.

Conveniently, the fourth graphic objects 123 include graphic masks and/or graphic cursors and/or graphic menus that can be employed to provide in input to the computerised device 50 configuration values CF to set-up the above-mentioned first protection parameters.

Figure 8:
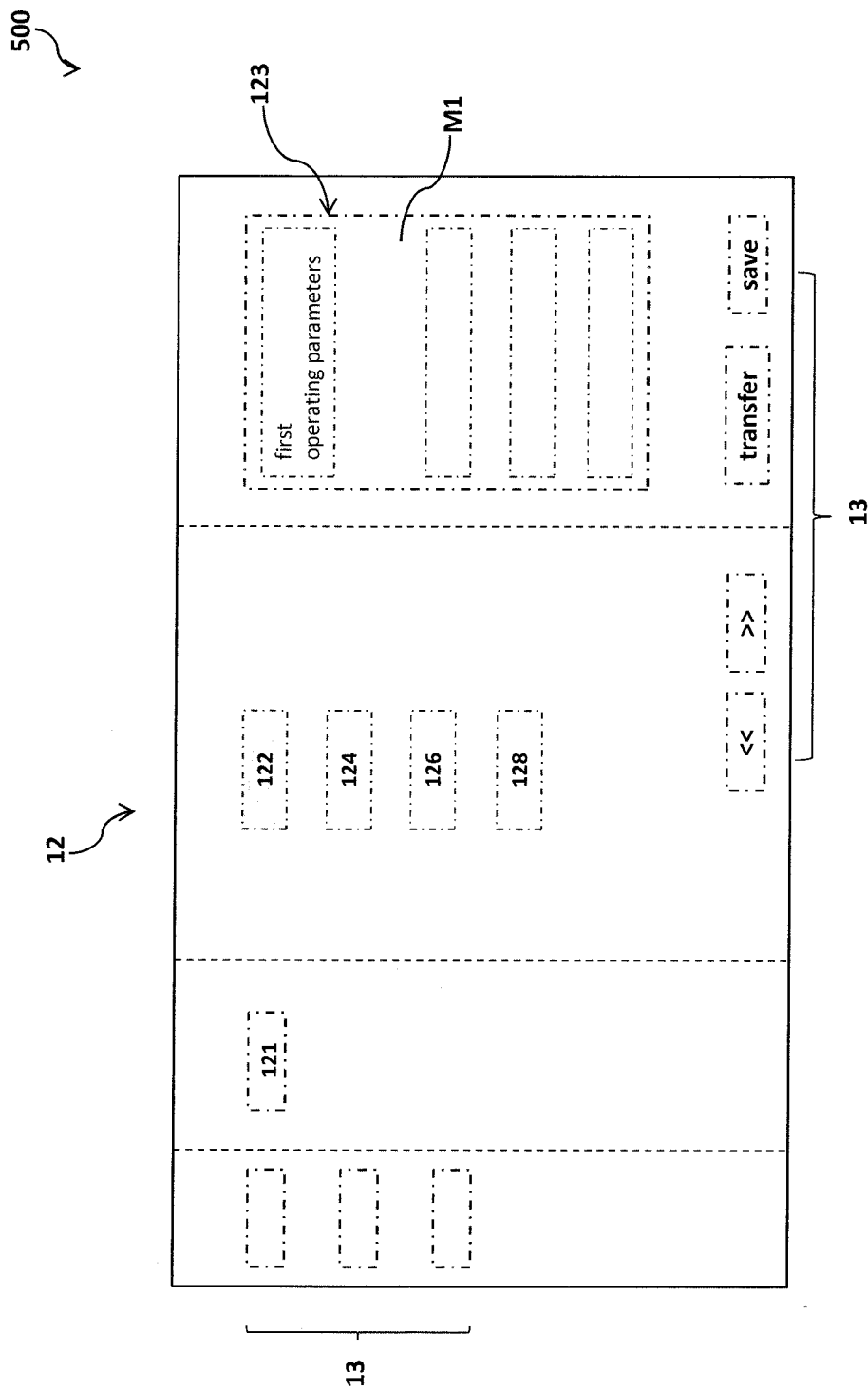

In the schematic example of FIGS. 7 and 8, the third graphic objects 122 comprise a graphic icon "first voltage settings" that can be clicked on to upload a corresponding graphic menu M1 (fourth graphic objects 123) on the GUI 500. The configuration values CF to set-up the above-mentioned first operating parameters may be typed on the sections of the graphic menu M1.

Preferably, the second graphic resources 12 comprise fifth and sixth graphic objects 124, 125 to set-up the above-mentioned second protection parameters.

The fifth graphic objects 124 are automatically uploaded on the GUI 500 by the computerised device 50 in response to the activation of the first graphic resources 11, more particularly upon the activation of a selected graphic object 111.

Upon the enabling by the second graphic objects 121, the fifth graphic objects 124 can be suitably activated to upload the sixth graphic objects 125 on the GUI 500.

The sixth graphic objects 125 are automatically uploaded on the GUI 500 by the computerised device 50 in response to the activation of the fifth graphic objects 124.

Conveniently, the sixth graphic objects 125 include graphic masks and/or graphic cursors and/or graphic menus that can be employed to provide in input to the computerised device 50 configuration values CF to set-up the above-mentioned second protection parameters.

Figure 9:
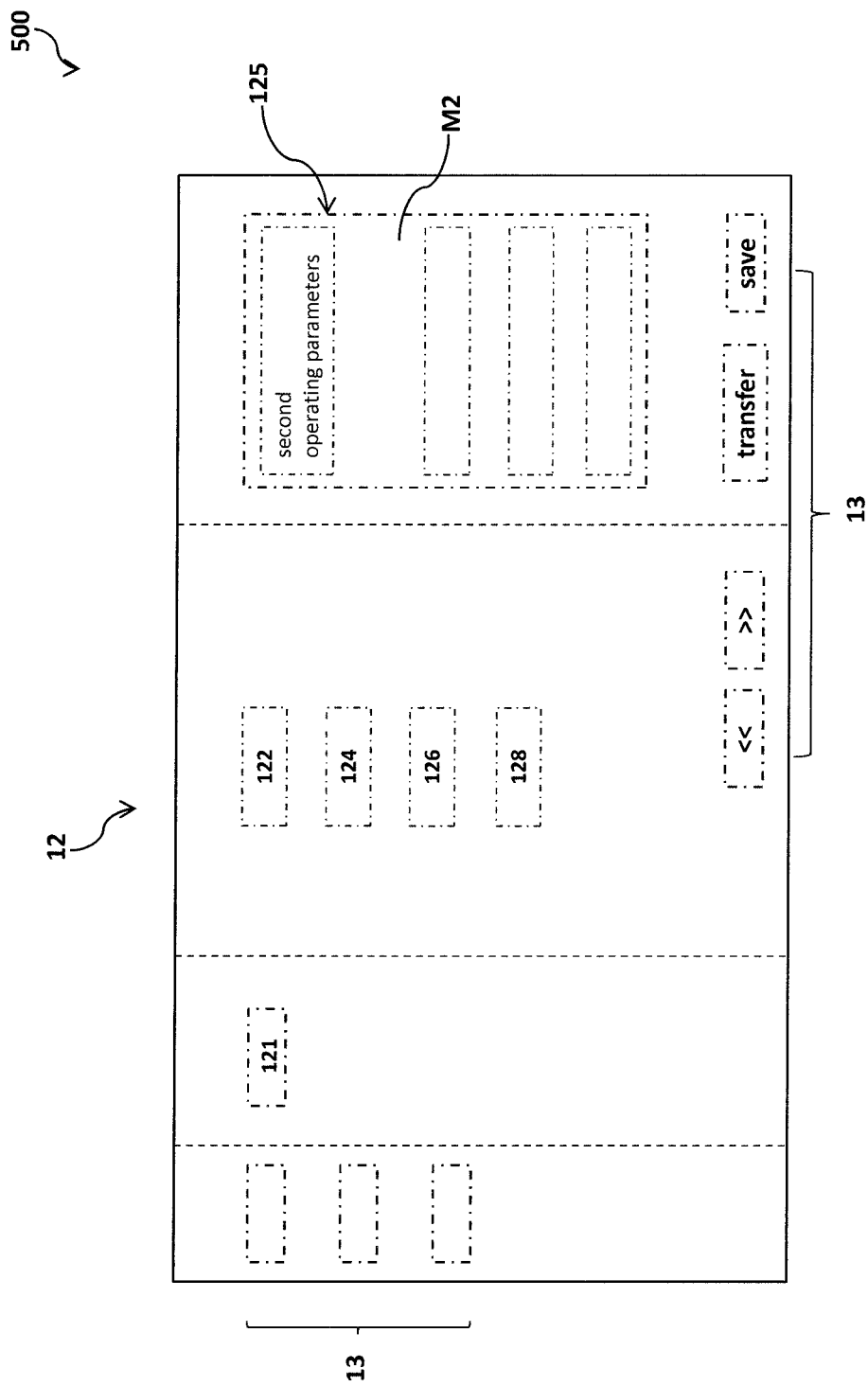

In the schematic example of FIGS. 7 and 9, the fifth graphic objects 124 comprise a graphic icon "frequency settings" that can be clicked on to upload a corresponding graphic menu M2 (sixth graphic objects 125) on the GUI 500. The configuration values CF to set-up the above-mentioned second operating parameters may be typed on the sections of the graphic menu M2.

Preferably, the second graphic resources 12 comprise seventh and eighth graphic objects 126, 127 to set-up the above-mentioned third protection parameters.

The seventh graphic objects 126 are automatically uploaded on the GUI 500 by the computerised device 50 in response to the activation of the first graphic resources 11, more particularly upon the activation of a selected graphic object 111.

Upon the enabling by the second graphic objects 121, the seventh graphic objects 126 can be suitably activated to upload the eighth graphic objects 127 on the GUI 500.

The eighth graphic objects 127 are automatically uploaded on the GUI 500 by the computerised device 50 in response to the activation of the seventh graphic objects 126.

Conveniently, the eighth graphic objects 127 include graphic masks and/or graphic cursors and/or graphic menus that can be employed to provide in input to the computerised device 50 configuration values CF to set-up the above-mentioned third protection parameters.

Figure 10:
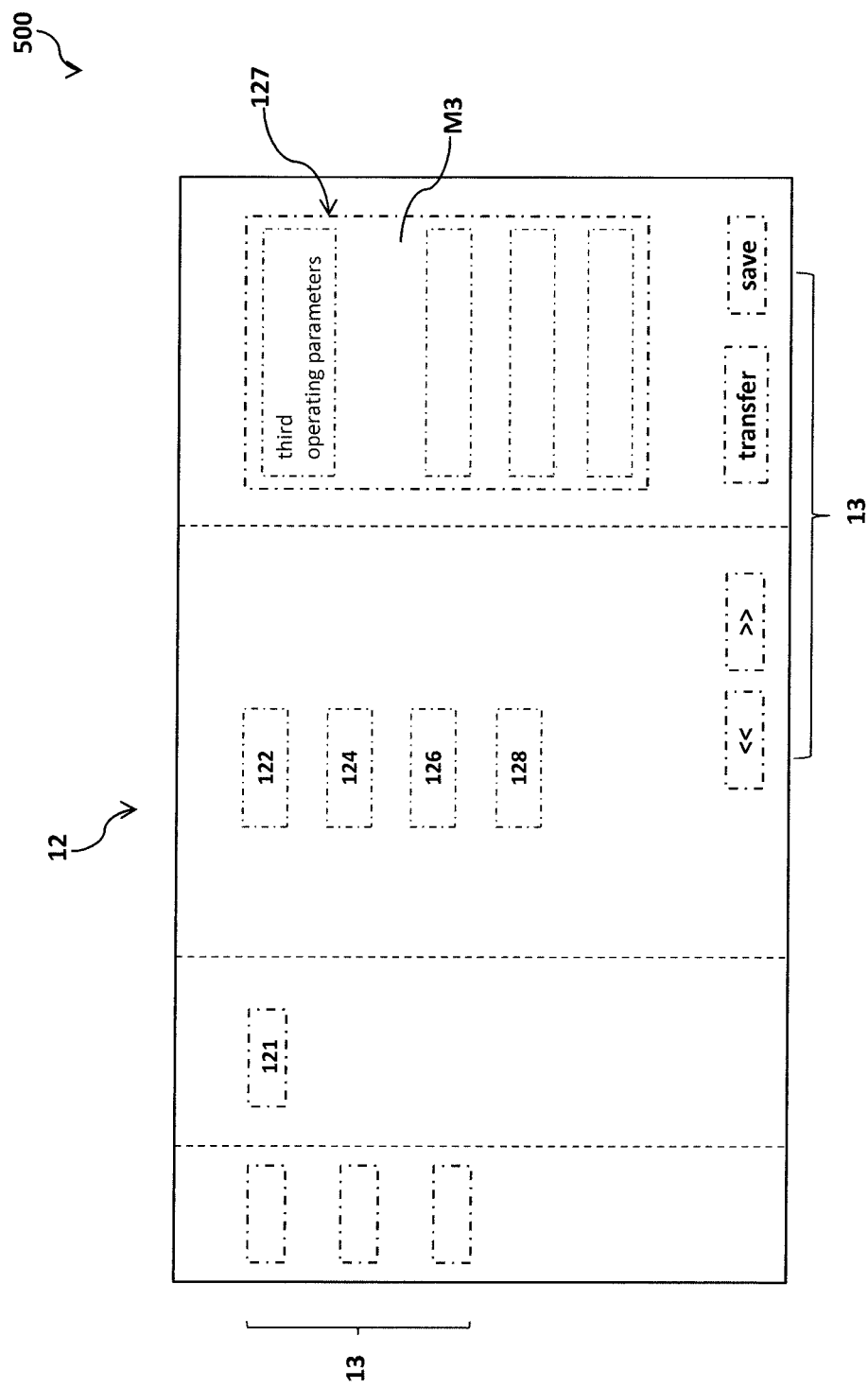

In the schematic example of FIGS. 7 and 10, the seventh graphic objects 127 comprise a graphic icon "second voltage settings" that can be clicked on to upload a corresponding graphic menu M3 (eighth graphic objects 127) on the GUI 500. The configuration values CF to set-up the above-mentioned third operating parameters may be typed on the sections of the graphic menu M3. Preferably, the second graphic resources 12 comprise ninth and tenth graphic objects 128, 129 to set-up the above-mentioned fourth protection parameters.

The ninth graphic objects 128 are automatically uploaded on the GUI 500 by the computerised device 50 in response to the activation of the first graphic resources 11, more particularly upon the activation of a selected graphic object 111.

Upon the enabling by the second graphic objects 121, the ninth graphic objects 128 can be suitably activated to upload the tenth graphic objects 129 on the GUI 500.

The tenth graphic objects 129 are automatically uploaded on the GUI 500 by the computerised device 50 in response to the activation of the ninth graphic objects 128.

Conveniently, the ninth graphic objects 128 include graphic masks and/or graphic cursors and/or graphic menus that can be employed to provide in input to the computerised device 50 configuration values CF to set-up the above-mentioned third protection parameters.

Figure 11:
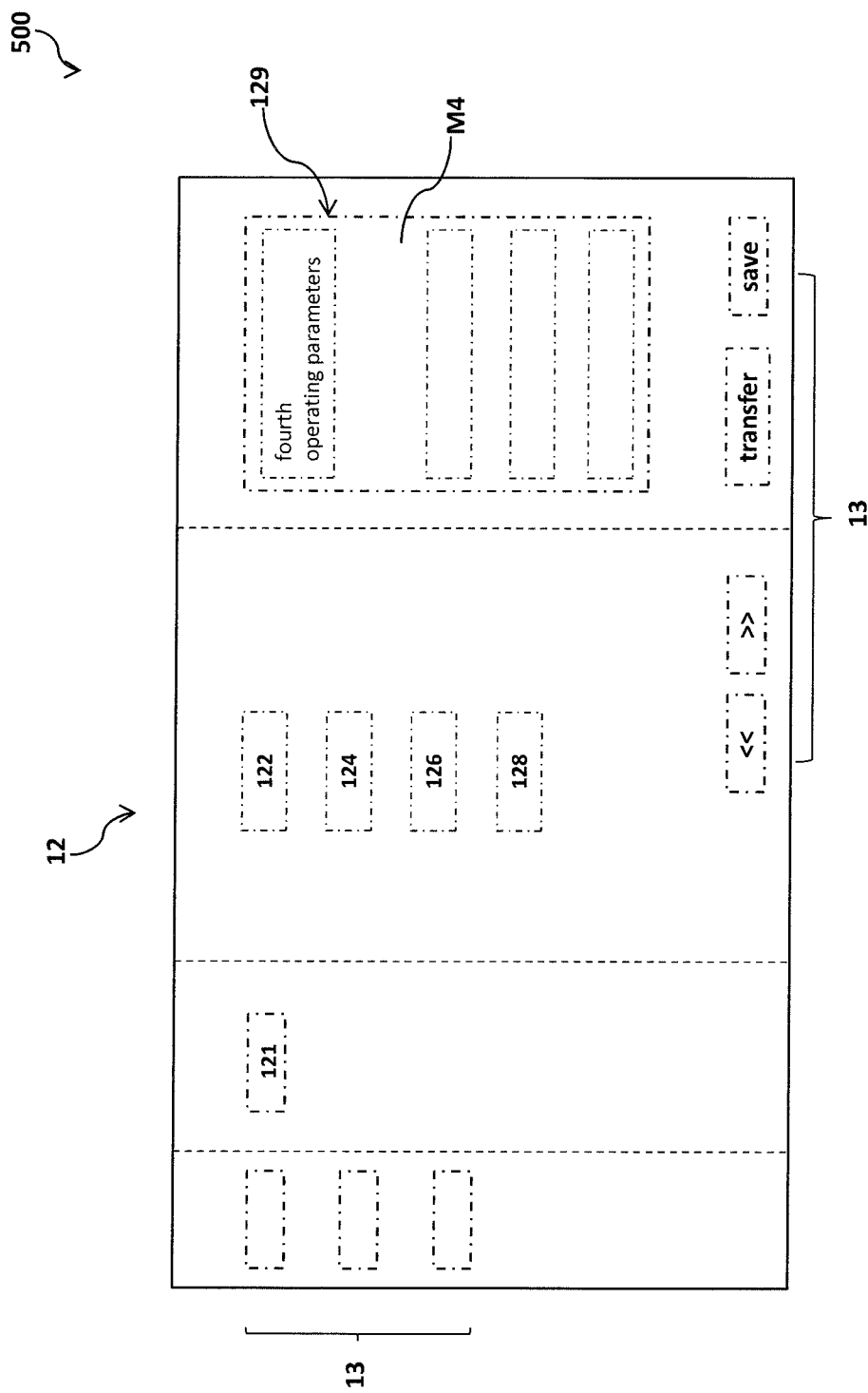

In the schematic example of FIGS. 7 and 11, the ninth graphic objects 128 comprise a graphic icon "input & output" that can be clicked to on upload a corresponding graphic menu M4 (tenth graphic objects 129) on the GUI 500. A user can type the configuration values CF to set-up the above-mentioned third operating parameters on the sections of the graphic menu M4. Conveniently, a user can save the configuration information provided in input through the GUI 500 on a storage memory of the computerised device 50 by activating a suitable auxiliary graphic resource 13 (e.g. a saving button "save").

According to the invention, before transmitting said configuration information to the electronic relay 2, the method 100 comprises a step, in which the computerised device 50 checks whether minimum operating requirements are met by said electronic relay.

This step is quite advantageous as it ensures a correct transmission of the configuration information to the electronic relay 2 and, consequently, the prompt operability of the said relay once it has been duly configured.

Preferably, said checking step is automatically carried out, at least partially, by the computerised device 50 upon establishing a communication with the electronic relay 2 and interrogating this latter.

If the above-mentioned checking step has not successfully completed, an alarm message is provided by the computerised device 50 on the GUI 50.

If the above-mentioned checking step has successfully completed, configuration information can be transmitted to the electronic relay 2 by activating a suitable auxiliary graphic resource 13 (e.g. a downloading button "transfer").

Accordingly, the method 100 comprises a step, in which the computerised device 50 transmits configuration information, which includes the configuration values CF, to the electronic relay 2. Upon receiving the configuration values CF, the electronic relay 2 can properly set its operating parameters and start operating.

Preferably, said configuration information is transmitted by the computerised device 50 to the electronic relay 2 via an Internet or a LAN or a WAN communication line.

Preferably, the transmission of said configuration information to the electronic relay 2 occurs upon the execution of an authentication procedure.

Preferably, such authentication procedure comprises a step, in which the computerised device 50 receives coded information to enable transmission of the configuration values to the electronic relay 2.

Such coded information may be received from a memory support (e.g. a USB storage device) operatively coupled to an input port (not shown) of the computerised device 50.

As an alternative, such coded information may be received from a remote computer source in communication with the computerised device 50 via the Internet or a LAN or a WAN.

Other solutions are however possible, according to the needs.

Preferably, such authentication procedure comprises a step, in which the computerised device 50 checks said coded information to control whether it is correct.

Preferably, such authentication procedure comprises a step, in which the computerised device 50 transmits said configuration information to the electronic relay 2, if said coded information is correct.

The method 100, according to the invention, allows fully satisfying the above-mentioned aim and objects.

The method allows a user to carry out the configuration process of the electronic relay 2 in an assisted manner with simple steps that can be carried out also by personnel having small experience in modelling electric power distribution networks.

The electronic relay 2 can thus be configured in a quick and efficient manner with a limited probability of errors.

The method is particularly suitable for implementation by a computerised device capable of communicating with the electronic relay 2 through the Internet or a LAN or a WAN. This allows avoiding or reducing the need for cabling activities during the configuration process.

The invention claimed is:

1. A method for configuring an electronic relay for an electric power distribution grid, said electronic relay being in operation operatively associated to a switching device of said electric power distribution grid to control operation of said switching device, wherein it comprises the following steps:

providing a graphic user interface on a computer display, said graphic user interface including graphic resources activatable by a user;

providing first graphic resources including one or more first graphic objects uploaded on said graphic user interface to assist a user in selecting a set of protection functionalities to be provided by said electronic relay, each first graphic object being activatable by the user to select a corresponding set of protection functionalities;

providing second graphic resources on said graphic user interface to assist a user in providing configuration values to configure operating parameters processed by said electronic relay to provide the selected set of protection functionalities, said operating parameters comprising first protection parameters related to voltage protection functionalities and second protection parameters related to frequency protection functionalities;

checking whether said electronic relay meets minimum operating requirements to operate; and if said electronic relay meets minimum operating requirements, transmitting configuration information including said configuration values to said electronic relay, said electronic relay being structured to control said switching device based on the configuration information.

2. The method, according to claim 1, wherein said operating parameters further comprise third protection parameters related to additional voltage protection functionalities.

3. The method, according to claim 2, wherein said operating parameters further comprise fourth protection parameters to manage inputs and outputs of said electronic relay.

4. The method, according to claim 3, wherein said second graphic resources comprise second graphic objects automatically uploaded on said graphic user interface upon activation of said first graphic resources, said second graphic objects being activatable to enable the activation of further graphic objects included in said second graphic resources.

5. The method, according to claim 4, wherein said second graphic resources comprise third and fourth graphic objects to set-up said first protection parameters, said third graphic objects being activatable, when enabled by said second graphic objects, to upload said fourth graphic objects on said graphic user interface, said fourth graphic objects being configured to assist a user in providing configuration values to set-up said first protection parameters.

6. The method, according to claim 1, wherein said second graphic resources comprise second graphic objects automatically uploaded on said graphic user interface upon activation of said first graphic resources, said second graphic objects being activatable to enable the activation of further graphic objects included in said second graphic resources.

7. The method, according to claim 6, wherein said second graphic resources comprise third and fourth graphic objects to set-up said first protection parameters, said third graphic objects being activatable, when enabled by said second graphic objects, to upload said fourth graphic objects on said graphic user interface, said fourth graphic objects being configured to assist a user in providing configuration values to set-up said first protection parameters.

8. The method, according to claim 6, wherein said second graphic resources comprise fifth and sixth graphic objects to set-up said second protection parameters, said fifth graphic objects being activatable, when enabled by said second graphic objects, to upload said sixth graphic objects on said graphic user interface, said sixth graphic objects being configured to assist a user in providing configuration values to set-up said second protection parameters.

9. The method, according to claim 6, wherein said operating parameters further comprise third protection parameters related to additional voltage protection functionalities, and wherein said second graphic resources comprise seventh and eighth graphic objects to set-up said secondary voltage protection parameters, said seventh graphic objects being activatable, when enabled by said second graphic objects, to upload said eighth graphic objects on said graphic user interface, said eighth graphic objects being configured to assist a user in providing configuration values to set-up said third protection parameters.

10. The method, according to claim 6, wherein said second graphic resources comprise ninth and tenth graphic objects to set-up said fourth protection parameters, said ninth graphic objects being activatable, when enabled by said second graphic objects, to upload said tenth graphic objects on said graphic user interface, said tenth graphic objects being configured to assist a user in providing configuration values to set-up said fourth protection parameters.

11. The method, according to claim 1, wherein said step of transmitting said configuration information to said electronic relay comprises the following steps:
receiving coded information to enable transmission of said configuration information to said electronic relay;
checking said coded information;
transmitting said configuration information to said electronic relay if said coded information is correct.

12. The method, according to claim 1, wherein said configuration information is transmitted to said electronic relay via an Internet or LAN or WAN communication line.

13. The method, according to claim 1, wherein said operating parameters further comprise fourth protection parameters to manage inputs and outputs of said electronic relay.

14. The method, according to claim 2, wherein said second graphic resources comprise second graphic objects automatically uploaded on said graphic user interface upon activation of said first graphic resources, said second graphic objects being activatable to enable the activation of further graphic objects included in said second graphic resources.

15. The method, according to claim 14, wherein said second graphic resources comprise third and fourth graphic objects to set-up said first protection parameters, said third graphic objects being activatable, when enabled by said second graphic objects, to upload said fourth graphic objects on said graphic user interface, said fourth graphic objects being configured to assist a user in providing configuration values to set-up said first protection parameters.

16. The method according to claim 1, wherein the sets of protection functionalities available for selection are based on an operative role of the switching device.

17. The method according to claim 16, wherein the sets of protection functionalities correspond to the CEI-016 standard.

18. The method according to claim 17, wherein the voltage protection functionalities correspond to the ANSI59 standard or the ANSI27 standard, and wherein the frequency protection functionalities correspond to the ANSI81H standard or the ANSI81L standard.

19. A computer readable storage medium comprising:
a set of software instructions executable by a processing resource effective to:
provide a graphic user interface on a computer display, said graphic user interface including graphic resources activatable by a user,
provide first graphic resources including one or more first graphic objects uploaded on said graphic user interface to assist a user in selecting a set of protection functionalities to be provided by an electronic relay, each first graphic object being activatable by the user to select a corresponding set of protection functionalities, provide second graphic resources on said graphic user interface to assist a user in providing configuration values to configure operating parameters processed by said electronic relay to provide the selected set of protection parameters related to voltage protection functionalities and second protection parameters related to frequency protection functionalities, check whether said electronic relay meets minimum operating requirements to operate, and if said electronic relay meets minimum operating requirements, transmit configuration information including said configuration values to said electronic relay, said electronic relay being structured to control a switching device based on the configuration information.

20. An electronic relay configuration computerized device comprising:

a memory structured to store a set of instructions; and a processing resource structured to execute the set of instructions stored on the memory effective to:

provide a graphic user interface on a computer display, said graphic user interface including graphic resources activatable by a user, provide first graphic resources including one or more first graphic objects uploaded on said graphic user interface to assist a user in selecting a set of protection functionalities to be provided by an electronic relay, each first graphic object being activatable by the user to select a corresponding set of protection functionalities, provide second graphic resources on said graphic user interface to assist a user in providing configuration values to configure operating parameters processed by said electronic relay to provide the selected set of protection functionalities, said operating parameters comprising first protection parameters related to voltage protection functionalities and second protection parameters related to frequency protection functionalities, check whether said electronic relay meets minimum operating requirements to operate, and if said electronic relay meets minimum operating requirements, transmit configuration information including said configuration values to said electronic relay, said electronic relay being structured to control a switching device based on the configuration information.

* * * * *